(12) United States Patent
    Hurter

(10) Patent No.: US 10,416,761 B2
(45) Date of Patent: Sep. 17, 2019

(54) ZOOM EFFECT IN GAZE TRACKING INTERFACE

(71) Applicant: ECOLE NATIONALE DE L'AVIATION CIVILE, Toulouse (FR)

(72) Inventor: Christophe Hurter, Toulouse (FR)

(73) Assignee: ECOLE NATIONAL DE L'AVIATION CIVILE, Toulouse (FR)

( * ) Notice: Subject to any disclaimer, the term of this patent is extended or adjusted under 35 U.S.C. 154(b) by 0 days.

(21) Appl. No.: 15/291,186

(22) Filed: Oct. 12, 2016

(65) Prior Publication Data
    US 2017/0108924 A1    Apr. 20, 2017

(30) Foreign Application Priority Data
    Oct. 14, 2015  (EP) ..................................... 15306629

(51) Int. Cl.
    *G06F 3/01*      (2006.01)
    *G06F 3/0484*    (2013.01)
    *G06T 3/40*      (2006.01)
    *G08G 5/00*      (2006.01)
    *G06F 3/0481*    (2013.01)

(52) U.S. Cl.
    CPC .......... *G06F 3/013* (2013.01); *G06F 3/04845* (2013.01); *G06T 3/40* (2013.01); *G08G 5/0026* (2013.01); *G08G 5/0082* (2013.01); *G06F 3/04815* (2013.01); *G06F 2203/04806* (2013.01)

(58) Field of Classification Search
    None
    See application file for complete search history.

(56) References Cited

U.S. PATENT DOCUMENTS

| | | | | |
|---|---|---|---|---|
| 7,561,143 B1* | 7/2009 | Milekic | ................... | G06F 3/013 345/156 |
| 9,377,852 B1* | 6/2016 | Shapiro | ................... | G06F 3/013 |
| 2005/0047629 A1* | 3/2005 | Farrell | .................... | G06F 3/013 382/117 |
| 2009/0248036 A1* | 10/2009 | Hoffman | ................ | A61B 1/045 606/130 |
| 2009/0256904 A1* | 10/2009 | Krill | ................... | G02B 27/0172 348/47 |
| 2013/0162632 A1* | 6/2013 | Varga | .................... | G06T 19/006 345/419 |
| 2013/0278631 A1* | 10/2013 | Border | ................. | G02B 27/017 345/633 |
| 2014/0316543 A1* | 10/2014 | Sharma | ................. | G06F 3/1454 700/94 |

(Continued)

FOREIGN PATENT DOCUMENTS

WO    2013/169237 A1    11/2013
WO    WO-2013169237 A1 *  11/2013  ............. G06F 3/013

OTHER PUBLICATIONS

European Search Report for 15306629.5, dated Dec. 21, 2015.

*Primary Examiner* — Yu Chen
(74) *Attorney, Agent, or Firm* — Meagher Emanuel Laks Goldberg & Liao, LLP

(57) ABSTRACT

A zoom operation in an eye tracking based graphical user interface, where the zoom operation, as initiated by a scroll wheel etc. takes place with respect to the focus of the user's attention as determined on the basis of eye tracking data. Mechanisms for determining the point of attention based on a sliding window recording point of regard and subject to a variety of weighting functions are proposed.

11 Claims, 8 Drawing Sheets

(56) References Cited

U.S. PATENT DOCUMENTS

2015/0338915 A1* 11/2015 Publicover .............. G06F 21/64
345/633
2017/0339399 A1* 11/2017 Hoffman ............ H04N 13/0468

* cited by examiner

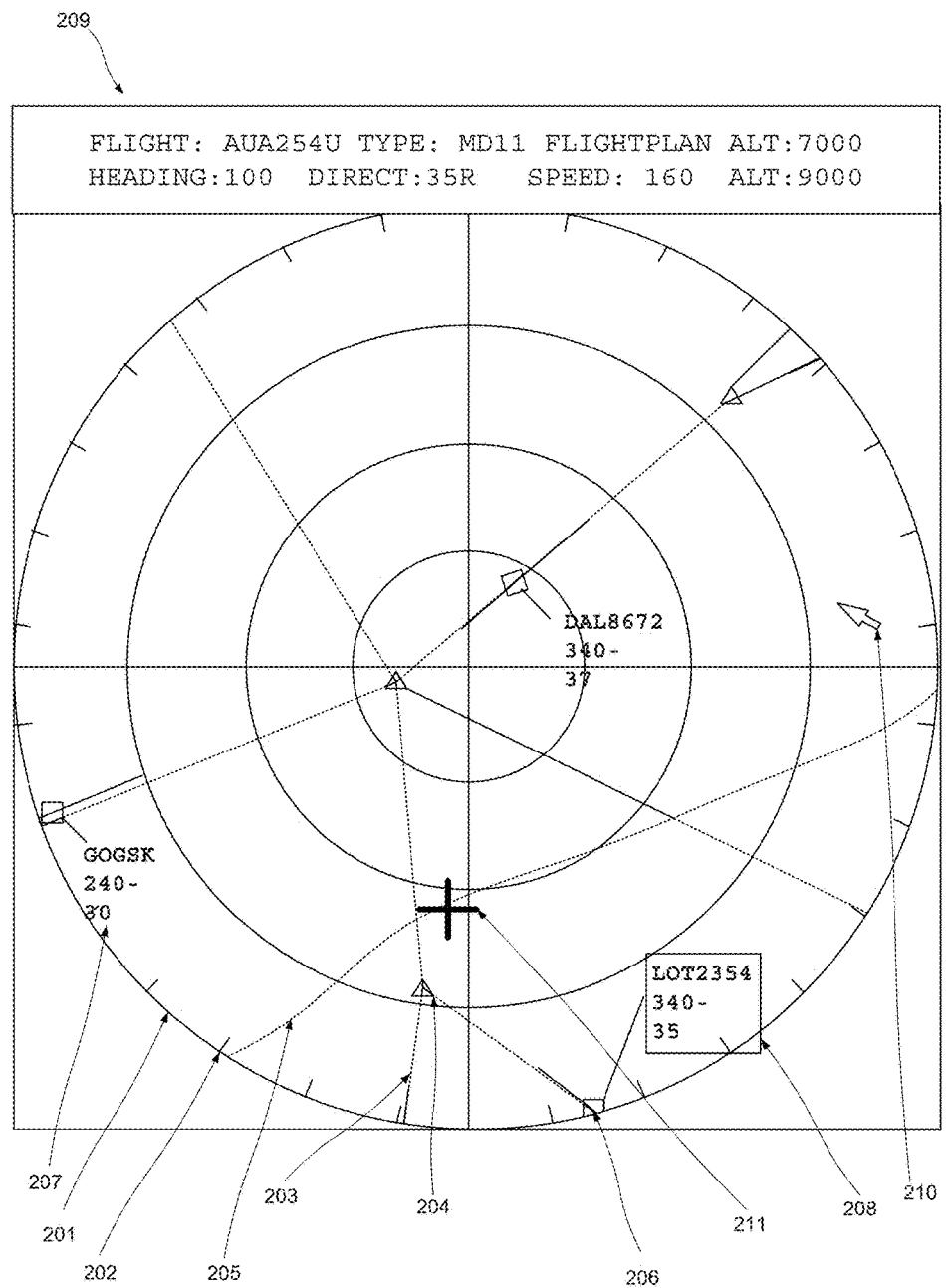

ZOOM EFFECT IN GAZE TRACKING INTERFACE

FIELD OF THE INVENTION

The present invention relates to graphical user interfaces supporting gaze tracking, and in particular scale shifting or zoom features in such interfaces.

BACKGROUND OF THE INVENTION

The information technology revolution that has taken place over the last fifty years or so has meant that many human activities now involve, and often revolve around the manipulation of information technology systems, and in particular computers. The nature of the interfaces supporting these interactions has evolved continually in parallel with the processing and telecommunications capacities of these systems, from punch cards, keyboards, mouse driven graphical user interfaces and most recently multi-touch touch screen interfaces, the richness and accessibility of information displayed to a user has increased, and the precision and facility of interactions improved. Nevertheless, such operations have systematically remained based on manual interaction with the devices in question.

Meanwhile, human physiology dictates that an individual's eyes be directed at whatever is the object of their attention. In principle, this provides an intuitive and transparent mechanism for interfacing with computers. In practice however, such interfaces have proved difficult to implement, requiring expensive optical hardware, and imposing significant restraints on the freedom of movement of the user in order to maintain satisfactory performance. Nevertheless, advances in technology are increasingly making gaze tracking approaches feasible, particularly in situations where a user must monitor a large number of moving elements in the interface, over a long period, and where the implications of a misinterpretation or failed manipulation of the interface in real time are sufficiently serious to justify the cost of such systems. Examples of such installations include air traffic control displays, head up displays in vehicles, and so on.

The existence in parallel of these two separate modes of interaction calls for effective hybrid interaction mechanisms making optimal use of the inherent strengths of each mode

SUMMARY OF THE INVENTION

In accordance with a first aspect there is provided a method of managing a graphical representation of a physical space within a larger space, comprising the steps of generating a graphical representation a selected space, wherein the selected space lies within a larger space and wherein the size of the selected space is defined with regard to a predetermined scale, and displaying the representation. A point of attention of a user within the representation is determined with reference to the point of regard of the user, and responsive to the user providing an input via a user interface, the selected physical space is redefined to correspond to a new selected space positioned with respect to and containing the point of attention, where the new selected space is situated in the larger space, and the new selected space is defined at a new scale. The graphical representation is then regenerated accordingly.

This approach supports an instinctive relationship with the interface, where the focus of a user's attention is automatically selected for closer scrutiny. By being able to expand or refine the user's field of awareness without changing their point of regard, it may be possible to present a correspondingly smaller area to the user at any one time, reducing the need for large, high resolution displays, and thereby reducing graphics processing requirements and energy consumption. Ready and instinctive awareness of ongoing events outside the user's direct field of vision can improve the user's ability to anticipate emerging problems, and take remedial measures earlier than with conventional systems. Depending on context, this will translate into improved safety and reduced costs.

According to a development of the first aspect, at the step of generating, the graphical representation is generated so as to incorporate a graphical user interface cursor.

By incorporating a graphical user interface cursor such as a mouse pointer the compatibility with existing graphical user interface platforms is ensured, providing synergies by offering the user a choice of interface mechanisms from which he may select based on the nature of the task at hand.

According to a further development of the first aspect the steps of generating, displaying and determining are repeated iteratively.

By continually updating the graphical representation, the user's impression of direct involvement in the interface is reinforced, improving the efficiency of interactions.

According to a further development of the first aspect, at the step of generating, the graphical representation is generated so as to incorporate an indication of the point of attention.

In some cases the zoom feature may seem to behave erratically since the point of attention selected by the system may differ from that intended by the user. To avoid doubt in this regard, the system may indicate the point that the system currently considers to reflect the point of attention.

According to a further development of the first aspect, the step of determining the point of attention of the user within the representation comprises determining a weighted average of the user's point of regard over a predetermined duration.

A weighted average over a predetermined duration makes it possible to more accurately determine the point of attention, by filtering out transient movements of the user's point of regard, and taking into account other predictive factors. This leads to a more transparent experience for the user, where the user interface seems to implicitly understand his true intention. This correspondingly translates into more rapid and efficient user interactions.

According to a further development of the first aspect, the step of determining the point of attention of a user within the representation comprises positioning said point of attention preferentially with respect to certain types of feature within said graphical representation.

Positioning the point of attention preferentially with respect to certain types of feature makes it possible to more reliably predict the point of attention at a statistical level, by paying less attention to less likely inputs. This leads to a more transparent experience for the user, where the user interface seems to implicitly understand his true intention. This correspondingly translates into more rapid and efficient user interactions.

According to a further development of the first aspect the centre of the new selected space is situated at the point of attention.

By shifting the point of attention to the centre of the display, it is possible to display surrounding elements more evenly, giving a more representative picture of the vicinity of the point of interest. This may avert the need for additional user interactions to obtain the same result, reducing system processing and memory demands, and accordingly energy consumption.

According to a further development of the first aspect, the selected space, the larger space and the graphical representation are two dimensional.

According to a further development of the first aspect, the selected space, the larger space and the graphical representation are three dimensional.

According to a further development of the first aspect, at the step of redefining the selected space, the centre of the selected space is unchanged with respect to the larger space.

By maintaining the centre of the selected space with respect to the point of attention, the zoom process is transparent, as the user has the impression of merely focussing his attention more closely on a fixed point. This may improve the immersive nature of the interaction, improving concentration and situational awareness.

According to a second aspect, there is provided a computer program adapted to implement the steps of the first aspect.

According to a third aspect, there is provided a computer readable medium incorporating the computer program of the second aspect.

According to a third aspect, there is provided an apparatus adapted to generate a graphical representation of a selected space, wherein the selected space lies within a larger space and wherein the size of the selected space is defined with regard to a predetermined scale. The apparatus is further adapted to cause a display unit to display the representation. The apparatus is further adapted to determine a point of attention of a user within the representation with reference to signals received from an eye tracking system, and to redefine the selected space to correspond to a new selected space positioned with respect to and containing the point of attention responsive to receiving an input via a user interface, the new selected space being situated in the larger space, and the new selected space being defined at a new scale. The apparatus is further adapted to regenerate the graphical representation on the basis of said redefined selected space, and to cause the display unit to display the regenerated representation.

This approach supports an instinctive relationship with the interface, where the focus of a user's attention is automatically selected for closer scrutiny. By being able to expand or refine the user's field of awareness without changing their point of regard, it may be possible to present a correspondingly smaller area to the user at any one time, reducing the need for large, high resolution displays, and thereby reducing graphics processing requirements and energy consumption. Ready and instinctive awareness of ongoing events outside the user's direct field of vision can improve the user's ability to anticipate emerging problems, and take remedial measures earlier than with conventional systems. Depending on context, this will translate into improved safety and reduced costs.

BRIEF DESCRIPTION OF THE DRAWINGS

The above and other advantages of the present invention will now be described with reference to the accompanying drawings, in which:

FIG. 2b presents the embodiment of FIG. 2a in a second phase;

DETAILED DESCRIPTION

Figure 1:
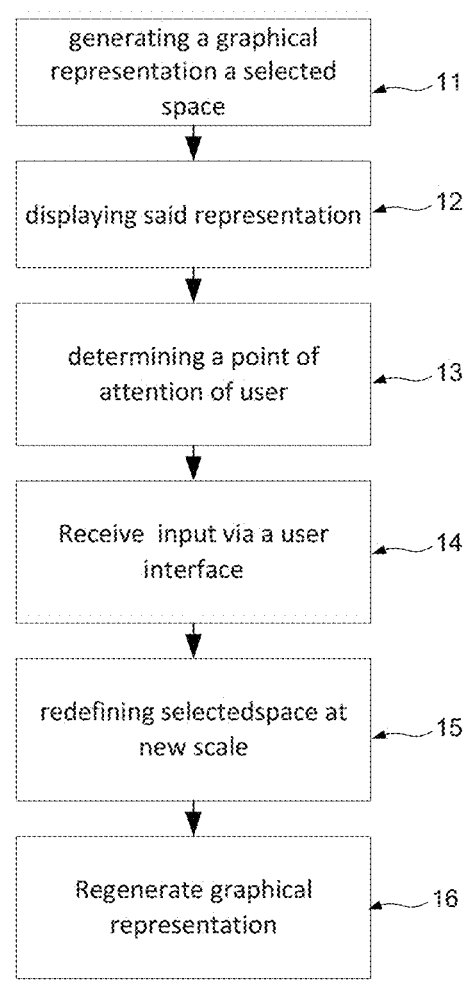
FIG. 1 shows the steps of a method according to a first embodiment.

As mentioned above, gaze based user interfaces are particularly suited to applications where a user must track monitor a large number of moving elements in the interface, over a long period and where the implications of a misinterpretation of failed manipulation of the interface in real time are sufficiently serious to justify the cost of such systems, such as air traffic control displays, head up displays in vehicles, and so on. Often in such applications the user will need to move between a high level overview covering a large volume of space (which may be a representation of real space, or a virtual space existing only within the interface environment) or number of entities with minimal detail, and a more focussed view providing more detail on a selected volume of space, number of entities, etc.

Moving between such views is often referred to as a zoom effect, as the user may have the impression of physically moving closer to or away from the point of interest. This type of effect will necessarily be based around a selected point, which is taken as the focal point towards which or away from which the user seems to move. In conventional user interfaces based on mouse interactions, this point will often be designated by specifically selecting a point for this purpose e.g. by clicking on it, or otherwise taking whatever interface element currently has focus, i.e. was selected most recently, as this focal point. In some cases, the current position of the mouse cursor may be taken to be the focal point. Since in such cases it is possible to move the mouse whilst implementing the zoom, the focal point of the zoom may also change during the zoom process. Often in such mouse based interfaces, the zoom effect is implemented by a scroll wheel on the mouse or elsewhere.

Accordingly, while a mechanism for mouse based interfaces is well defined, this is not the case for gaze tracking interfaces. One particular difficulty arises due to the tendency for a users regard to move continually within the interface, flitting from point to point, hovering around an area of interest yet darting back and fourth amongst points of secondary importance. In such an environment, the system is faced with a significant challenge in determining which point should be taken as the focal point of the zoom.

Another particular difficulty arises from the fact that the contexts in which gaze based interfaces are particularly appropriate often lack fixed objects such as Icons etc which can be considered as having focus, for example because any such objects may move quickly and unpredictably.

Another issue lies in the provision of a suitable mechanism for initiating and controlling the zoom operation.

Eye tracking devices are mostly off-the-shelf products and need to be integrated in existing systems by the customers themselves. Such integration can be a problem especially when existing environment such as flight or drive simulators does not allow communication with third party software.

Finally, eye trackers produce large amounts of data which need to be stored and then processed. When an eye tracker is used as a system input the data must be processed in real- or near real-time, thus adding further complications.

FIG. 1 shows the steps of a method according to a first embodiment. As shown in FIG. 1, there is provided a method of managing a graphical representation of a selected space within a larger space. This may be a representation of a real physical space, for example a portion of land or airspace, or alternatively a virtual desktop or other computer generated environment. The method begins at step 11 of generating a representation of a selected portion of the larger space. This representation will inherently have a scale, either as a fraction of the larger space, or in terms of the real dimensions of the corresponding physical space.

The representation itself may be generated from any suitable source including geographic data files, other predefined graphical elements or live video signals, or any combination of these or other data types. In particular, it may be generated wholly or partially as a representation of the operating system of the device generating the representation.

The selected space, and the larger space may be two or three dimensional. The representation may also be two or three dimensional. Often, the representation may be a two dimensional representation of the surface of the earth, which is of course inherently three dimensional given the generally spherical form of the earth, and the variations in its diameter at different points on its surface. It is nevertheless common to represent portions of the earth's surface two dimensionally by applying a suitable projection, and disregarding local deviations from the average local diameter (hills, etc.).

The method next proceeds to step 12 at which the graphical representation is displayed to the user. This display may be by means of a conventional CRT or LCD monitor, whether as a 2d or 3d image, by holographic means or otherwise.

The method next proceeds to stem 13 at which the point of attention of the user is determined, with reference to the point of regard of the user.

Various systems are used to track eye movements, which may be adapted to implement this step. Any such system may be used, including head-mounted, table-based, or remote systems. These devices commonly use video-cameras and processing software to compute the gaze position from the pupil/corneal reflection of an infra-red emissive source. To increase data accuracy with table devices, it is possible to limit head movement with a fixed chin on the table. A calibration process is also common, to ensure system accuracy. The calibration process usually consists of displaying several points in different locations of the viewing scene; the Eye Tracking software will compute a transformation that processes pupil position and head location. Table-based eye trackers are usually binocular and can thus calculate eye divergence and output raw coordinates of the Gaze Intersection Point (GIP) in x-y pixels applied to a screen in real-time. This feature allows integration of gaze position as an input for the HMI. Areas Of Interest (AOIs) are then defined to interact with the user. When the gaze meets an AOI an event is generated and a specific piece of information will be sent. When an AOI is an element of the interface with some degree of freedom (a scrollbar, for instance), one is talking about a dynamic AOI (dAOI). Tracking of a dAOI is more challenging compared to a static one.

In some embodiments the point of attention may simply be taken to be the instantaneous point of regard, that is, whatever point the eye tracking system considers the user to be looking at the instant the input is received at step 14. In other embodiments, the point of attention may take into account other factors such as system status, historical information and the like. In certain embodiments, the determination of the point of attention of the user may involve determining a weighted average of the users point of regard over a predetermined duration—further embodiments are described hereafter.

There are two kinds of Eye Tracking data collection method. The first and the most common is to use the original software (for data recording and analysis) that is often provided by the device manufacturer. The second is to develop a specific software module (using a System Developer Kit (SDK), usually provided with the eye tracker) for data collection. Various parameters will impact the precision of raw data issued from the Eye Tracking system. Among them, the video frame rate and the camera resolution are critical for the Eye Tracking software. Existing systems use a video frame rate from 30 to 2000 Hz, and it is expected that higher frame rates will be used in future systems. For high precision Eye Tracking, high frequency rate will improve data filtering but will also in-crease the data size and processing time which is critical for online processing.

Eye tracking data collected during an experiment can be analyzed by statistical methods and visualization techniques to reveal characteristics of eye movements (fixations, hot spots, saccades, and scanpaths). Fixation, saccade, and smooth pursuit events can be computed from raw data coordinates. To correlate these pieces of information with the Human-Machine Interface (HMI), some interface-related data have to be collected (i.e. object coordinates within the interface, HMI events like mouse hover, etc.). This information can be used to infer user behaviour:

fixation (smooth pursuit) indicates visual encoding during overt orienting;

saccade is the process of visual research when the focus of attention is shifted;

number of fixations on a specific object is often an indicator of the importance attached to a specific object;

mean fixation duration or total dwell time (that is, the period the user's gaze is determined to be fixed on a particular point or region) can be correlated to the visual demand induces by the design of an object or the associated task engagement.

Saccades are rapid eye movements that serve to change the point of fixation, and during which, as it is often considered, no information is encoded. Fixations occurs when the user fixate an object (usually during a 150 ms threshold) and encode relevant information. Sometimes shorter fixations are taken into account. Unlike long fixations that are considered to be a part of top-down visual processing, short ones are regarded as part of a bottom-up process. It is estimated that 90% of viewing time is dedicated to fixations. Other complex ocular events like glissades or retro-saccades could be considered. There exist numerous algorithms of eye movement event detection. Still, there is no general standard for these algorithms. The blink duration and frequency can be used to assess cognitive workload, both of which can be collected with an eye-tracker. Variation of the pupil diameter can also be used as an indication of the cognitive workload, defined as task-evoked pupillary response (TEPR). However, light sources (environment, electronic displays, etc.) must be strictly controlled since the pupil light reflex is more pronounced than the impact of the cognition on pupil size. Moreover, even the luminance of the fixation area (even when the luminance of the computer screen does not change) has an impact on the pupil size. Scanpaths can also provide insight on HMI usage. In general, collected and cleaned data can be analyzed to infer causal links, statistics, and user behaviour. By considering these various factors, the system attempts to continuously maintain an indication of the point in the display which represents the user's current focus.

In practice, this step will generally be repeated at intervals or continuously for the purposes of other functions of the user interface.

When it is determined that a user has provided a specific input via the user interface at step 14, the method proceeds to step 15 at which the selected space is redefined to correspond to a space in said larger space at a new scale, and positioned with respect to the point of regard determined at step 13. In some embodiments, the new selected space may be centred on the point of regard determined at step 13, or alternatively, offset in any direction by a predetermined absolute distance, or proportion of the display area.

In some embodiments, the system may seek to intelligently define the selected space so as to contain the point of the regard and as many as possible entities, or as many as possible entities of a particular type.

Generally speaking, depending on the input provided by the user at step 14, the new scale may be larger or smaller than the scale used at step 11, corresponding to an inward zoom or outward zoom respectively.

The user input may be provided by conventional interface operations such as performing a "click" operation with the mouse, by touching a zone of the display where this has a touchscreen interface or the like, or using designated keys on a keypad, a foot pedal, mouse or keyboard scroll wheel, jog dial, joystick or the like. The user will generally have an option of zooming in or out, unless already at the maximum zoom level in either direction.

In some cases, there may be defined a plurality of fixed scales, whereby the user input prompts the shifting of the selected scale to the next defined increment.

In some cases, for example where a scroll wheel, jog dial etc. is used, the rate of change of scale may be determined as being a function of the rate at which the wheel or dial is turned.

Once the system determines to redefine the selected space at a new scale, this may be achieved progressively by means of a series of intermediate positions between the current selected space and the initial selected space, so as to simulate the effect from the point of view of a user of travelling towards, or away from (depending on whether they are zooming in or out) the point of regard.

In some cases, it may be desirable to change the orientation of the display during the zoom. For example, in some cases it may be desirable to adopt some other orientation for example to better accommodate certain features in the same view, to align the orientation either along or against the direction of travel of the entity of interest, to align with some feature in the selected physical space such as a road, runway, coastline, etc., or otherwise. Where a series of intermediate selected physical spaces are selected, they may correspondingly adopt intermediate orientations, so as to simulate a progressive re-orientation. It will be appreciated that where the display is three dimensional, this reorientation may correspondingly take place about any axis.

Accordingly, once the selected space is redefined, the graphical representation is generated at this new scale at step 16.

As mentioned above, gaze tracking interfaces are particularly common in situations where a user must track a large number of moving elements in the interface, over a long period and where the implications of a misinterpretation of failed manipulation of the interface in real time are sufficiently serious to justify the cost of such systems. One example of such installations is in air traffic control displays, where air traffic controllers must monitor a moving aircraft in a designated airspace. An embodiment will now be described in such a context.

Figure 2A:
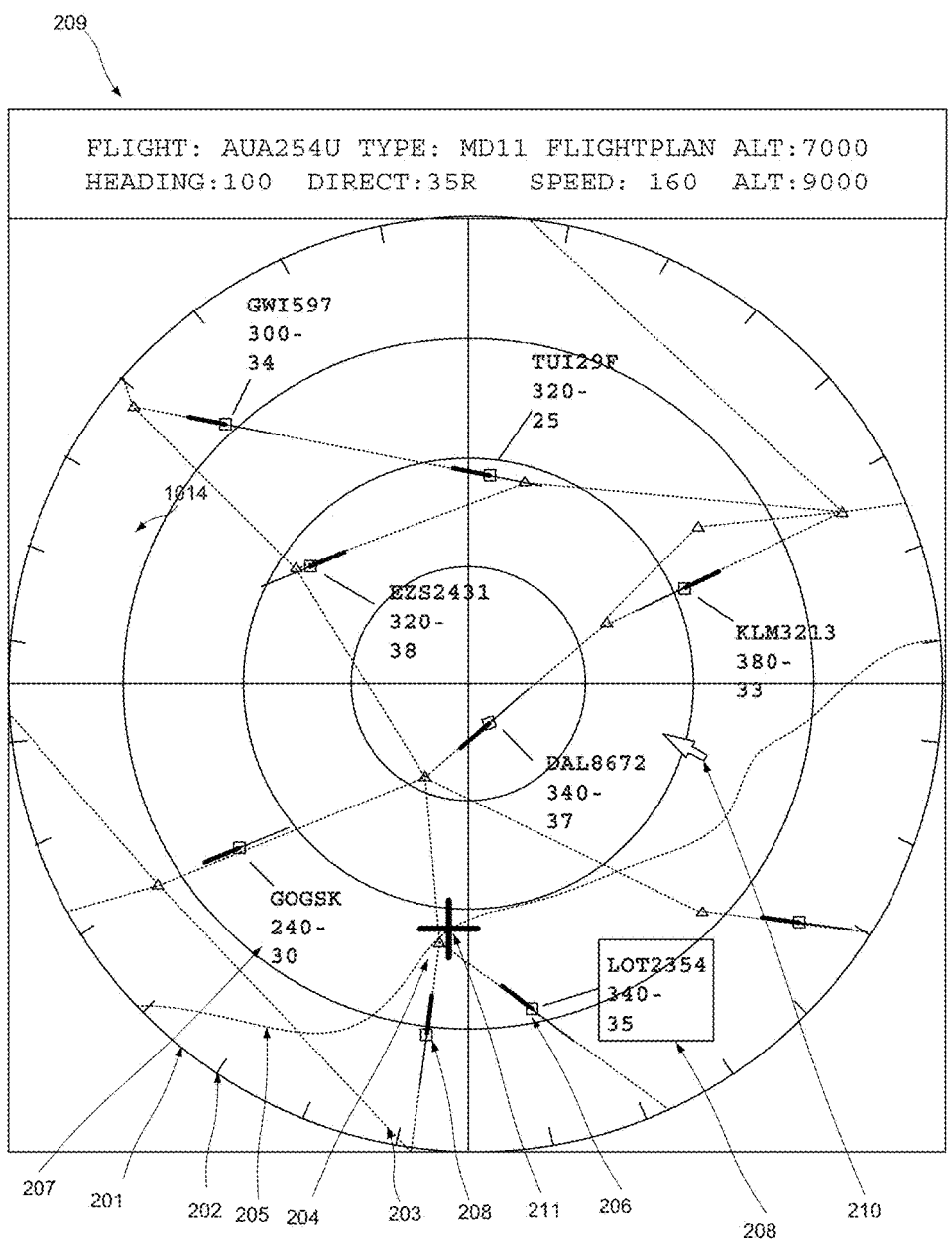
FIG. 2a presents an embodiment in a first phase.

FIG. 2a presents an embodiment in a first phase. As shown in FIG. 2a, there is presented a circular perimeter 201 divided by a reticule whose centre corresponds to the centre of this circular region, which is centred on a point of interest which may be the location of the display itself, and hence the user of the display. The circular region is further more divided by three progressively smaller circles sharing the axis of the circular perimeter 201. This circle represents a substantially cylindrical volume of space in the real word, as projected on the underlying ground, and accordingly is associated with a scale. This space corresponds accordingly to the selected space with respect the representation of FIG. 2a is generated in accordance with the method described with respect to FIG. 1 above. The diameter of the smallest circle is one quarter of the diameter of the circular perimeter, the diameter of the second smallest circle is half that of the circular perimeter, and the diameter of the largest circle is three quarters of the diameter of the circular perimeter, so that these circles can be used to determine the distance of any item on the display from the point of interest. The four axes of the reticule conventionally correspond to the cardinal points of the compass, and as shown the circular perimeter is additionally provided with markings indicating 10 degree increments around the perimeter, so that the bearing of any object on the display with respect to the point of interest may also readily be determined.

While the forgoing display features are generally static, there are furthermore shown a number of features that are dynamically generated. These include geographical features 205, representing for example features of the ground at the bottom of the volume under observation. Other features include predetermined flight paths 203 structured around way markers 204. Aircraft 206 are represented by small squares, and associated with lines indicating their current bearing. Information 207 associated with each plane is represented in the proximity of each aircraft.

The display shown in FIG. 2a is generally associated with a graphical user interface, which may permit the user to change the point of interest, or to obtain more information about a particular object shown in the representation. For example, where a user requires more detailed information about a particular aircraft, this may be selected as shown by the dark box 208, causing additional details associated with the same aircraft to be displayed in the box 209.

As shown, there is further provided a mouse cursor, which is directed by the user with a mouse or similar cursor control device and may be used to interact with the interface in a conventional manner.

As shown, there is further provided a gaze cursor 211. This reflects the position that the system currently considers to be the focus of the users gaze on the basis of the various considerations described above. It will be appreciated that the movement of the gaze cursor 211 is entirely independent of the movement of the mouse cursor 210.

In accordance with step 14 of the embodiment described with reference to FIG. 1, when the user submits a specified input, the selected space is redefined on the basis of a new scale. As discussed, this may be a larger or smaller scale, corresponding to a zoom in operation or zoom out operation respectively, and may zoom by a greater or lesser extent, with or without intermediate positions, with or without an accompanying change in orientation, etc. as discussed above.

At step 16 of the method described with reference to FIG. 1, the graphical representation is regenerated on the basis of the redefined selected space.

FIG. 2b presents the embodiment of FIG. 2a in a second phase. This second phase corresponds to the graphical representation as regenerated on the basis of the redefined selected space.

As shown in FIG. 2b, there is presented a circular perimeter 201 divided by a reticule whose centre corresponds to the centre of this circular region, which is centred on a point of interest which may be the location of the display itself, and hence the user of the display. The circular region is furthermore divided by three progressively smaller circles sharing the axis of the circular perimeter 201. This circle represents a substantially cylindrical volume of space in the real word, as projected on the underlying ground, and accordingly is associated with a scale. This space corresponds accordingly to the new selected space with respect the representation of FIG. 2b is generated in accordance with the method described with respect to FIG. 1 above. The elements 201, 202, 203, 204, 205, 206, 207, 208, 209, 210 and 211 correspond to the elements with the same reference numerals in FIG. 2a. As shown, although the relative positions of the different elements are retained, the elements still visible take up a larger proportion of the selected area. In this embodiment, the gaze cursor 211 remains in the same position relative to its position in FIG. 2a, and this point is the focus of the zoom operation. In other embodiments, the gaze cursor may be panned to the centre of the display, as discussed below, whilst retaining its relative position with respect to the other elements. In other words, the system has zoomed in on the position of the gaze cursor as shown in FIG. 2a, to produce the graphical representation of FIG. 2b.

It will be appreciated that once the graphical representation is regenerated, the gaze cursor 211 may begin to move around the display again as it follows the user's gaze.

Once the graphical representation is regenerated on the basis of the new selected space and displayed to the user, the system may further redefine the selected space to revert to the initial selected physical space. This may occur automatically after a predetermined time, or in response to an action by the user for example by means of conventional interface operations such as moving a cursor over a graphical user interface widget with a mouse, trackerball or the like, and performing a "click" operation, by touching the widget in question where the display has a touchscreen interface or the like, or by any other suitable graphical user interface operation. Still further, a simple action by means of a keypad, foot pedal, mouse button may be sufficient in some cases to cause the system to revert to the initial selected space.

Once the system determines to revert to the initial selected space, this may be achieved progressively by means of a series of intermediate scales between the current scale and that used in generating the graphical representation of the initial selected physical space so as to simulate the effect from the point of view of a user of moving in towards, or back away from their starting position. This simulated journey may follow a direct line between the two points, or follow some other route, for example as dictated by available ground routes or flight paths. Where a particular path was followed from the initial selected physical space to the entity of interest, the same path may be followed in reverse back to the initial selected physical space, or not as desired.

Similarly, it may be desirable to change the orientation of the display, in particular where the orientation was changed between the representation of the initial selected space and the new selected space. Where a series of intermediate selected spaces are defined, they may correspondingly adopt intermediate orientations, so as to simulate a progressive re-orientation.

It will be appreciated that where the display is three dimensional, this reorientation may correspondingly take place about any axis.

While in the embodiment of FIGS. 2a and 2b a gaze cursor is rendered as part of the graphical representation, the gaze cursor may equally be invisible to the user in a variant of this or any other embodiment described herein, or otherwise.

In some implementation rendering the gaze cursor may disturb the user, since visible eye cursor can attract user attention and create possibly undesirable effects such as the phenomenon known as cursor shift.

As discussed above, the definition of the point of regard, and where applicable, the location of the gaze cursor, is not a trivial matter. On one hand the gaze of the user moves continually over the graphical representation, and it may not always be clear that the user is deliberately fixing his regard in a particular location. On the other hand the gaze of the user may often pause in a particular location without this necessarily indicating a requirement by the user that any particular step be taken with regard to the information conveyed in that area. Filtering this input so as to identify the point in the graphical representation that can best be considered to represent the instantaneous focus of the users attention (which may differ from the instantaneous point of gaze) helps improve the prospects of achieving the user's true intention when he or she operates the user interface, for example at step 14 of the method described with respect to FIG. 1.

A variety of mechanisms may be envisaged for improving performance in this regard.

Figure 3:
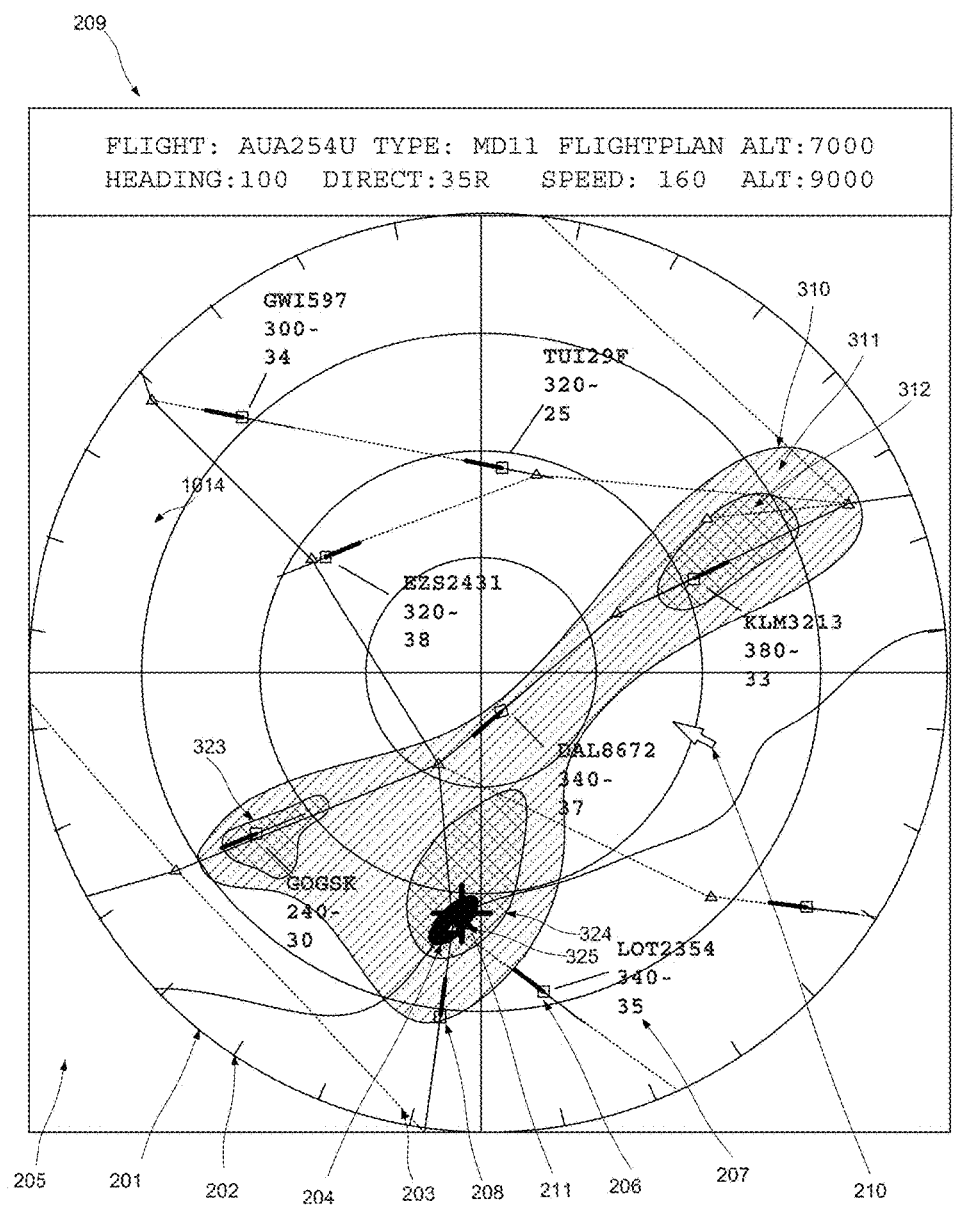
FIG. 3 shows a further embodiment offering improved definition of the point of attention.

FIG. 3 shows a further embodiment offering improved definition of the point of attention. FIG. 3 shows a similar graphical representation to that of FIG. 2, and correspondingly numbered elements can be considered to be identical. Furthermore, as shown in FIG. 2 here is provided a shaded zone 310. As shown, the shaded zone incorporates 5 different areas, which are each shaded with one of three different levels of shading. Specifically, area 311 is lightly shaded, areas 312, 313 and 314 are heavily shaded, and zone 315 is black, furthermore, these areas are disposed in a hierarchical manner, so that heavy shaded areas are situated in the lightly shaded area, and the black area is situated in a heavily shaded area. This type of representation may be referred to a heat map. We may consider that if the graphical representation is divided into a plurality of regions, and that the location of the instantaneous point of regard in each of these regions is recorded, a graphical representation of the average presence in these regions might look something like the zone 310, where the intensity of the shading represents the amount of the recorded duration that the point of regard was present in each region, whereby the darker the shading, the more time was spent in the area in question. On this basis, the centre of the darkest area may be selected as the current point of attention, as determined at step 13 of the method described with reference to FIG. 1. In some cases, the recorded duration may be a rolling window, whereby the record is continually updated with recent values, whilst the oldest values are discarded. In some cases, the prominence given to each region may take into account not only the duration for which the instantaneous point of regard was located in that region, but also how recently that presence was recorded, so that more recent activity will be accorded more prominence than older activity. In some cases, a region may be given more prominence if it is in a defined proximity to other regions through which the point of regard has passed during the recorded duration, so as to further emphasise areas recording persistent activity at the expense of regions receiving only occasional or sporadic attention. Similarly, in some cases the instantaneous point of regard may be considered to have an area of effect greater in size than the recorded regions, so that a number of adjacent regions may record the presence of the instantaneous point of regard for any given instant. Still further, a greater weighting may be accorded regions closer to the centre of the adjacent regions. It will be appreciated that the areas need not be displayed to the user, but merely calculated as the basis of the definition of the most likely point of interest to the user. Any number of levels of duration of presence (represented by different degrees of shading in FIG. 3) may be defined, and the number of levels and/or the thresholds between levels may be varied dynamically depending on system conditions. The point of regard data of a plurality of users may be combined to define the point of attention for one or more of those users, or for another user.

Another mechanism for determining the point of attention may involve positioning the point of attention preferentially with respect to certain types of feature within the graphical representation. This may involve assigning the point of attention preferentially to particular parts of the screen. Certain features, objects, entities or icons may be defined in the graphical representation which a zoom action is particularly likely. Where this is the case, such objects, entities or icons may be afforded a magnetic effect in the user interface, such that whenever the point of regard is in the vicinity of that feature, object, entity or icon, the point of attention is assumed to be the nearby feature, object, entity or icon.

The two preceding approaches may of course be combined, for example by assigning particular weightings to particular regions of the graphical representation, such that time spent by the point of regard on certain regions has a greater effect than in certain other regions, where the high weighting regions are those corresponding to the features, objects, entities or icons. Similarly, different regions may have a capture radius, where certain regions only register the passage of the point of regard if it passes right over them, whilst other regions register the passage of the point of regard if it merely passes close by, where the greater capture radius regions are those corresponding to the features, objects, entities or icons.

According to certain embodiments there is proposed a zoom operation in an eye tracking based graphical user interface, where the zoom operation, as initiated by a scroll wheel etc. takes place with respect to the focus of the user's attention as determined on the basis of eye tracking data. Mechanisms for determining the point of attention based on a sliding window recording point of regard and subject to a variety of weighting functions are proposed.

The disclosed methods can take form of an entirely hardware embodiment (e.g. FPGA), an entirely software embodiment (for example to control a system according to the invention) or an embodiment containing both hardware and software elements. Software embodiments include but are not limited to firmware, resident software, microcode, etc. The invention can take the form of a computer program product accessible from a computer-usable or computer-readable medium providing program code for use by or in connection with a computer or an instruction execution system.

A computer-usable or computer-readable can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium.

In some embodiments, the methods and processes described herein may be implemented in whole or part by a user device. These methods and processes may be implemented by computer-application programs or services, an application-programming interface (API), a library, and/or other computer-program product, or any combination of such entities.

The user device may be a mobile device such as a smart phone or tablet, a computer or any other device with processing capability, such as a robot or other connected device.

Figure 4:
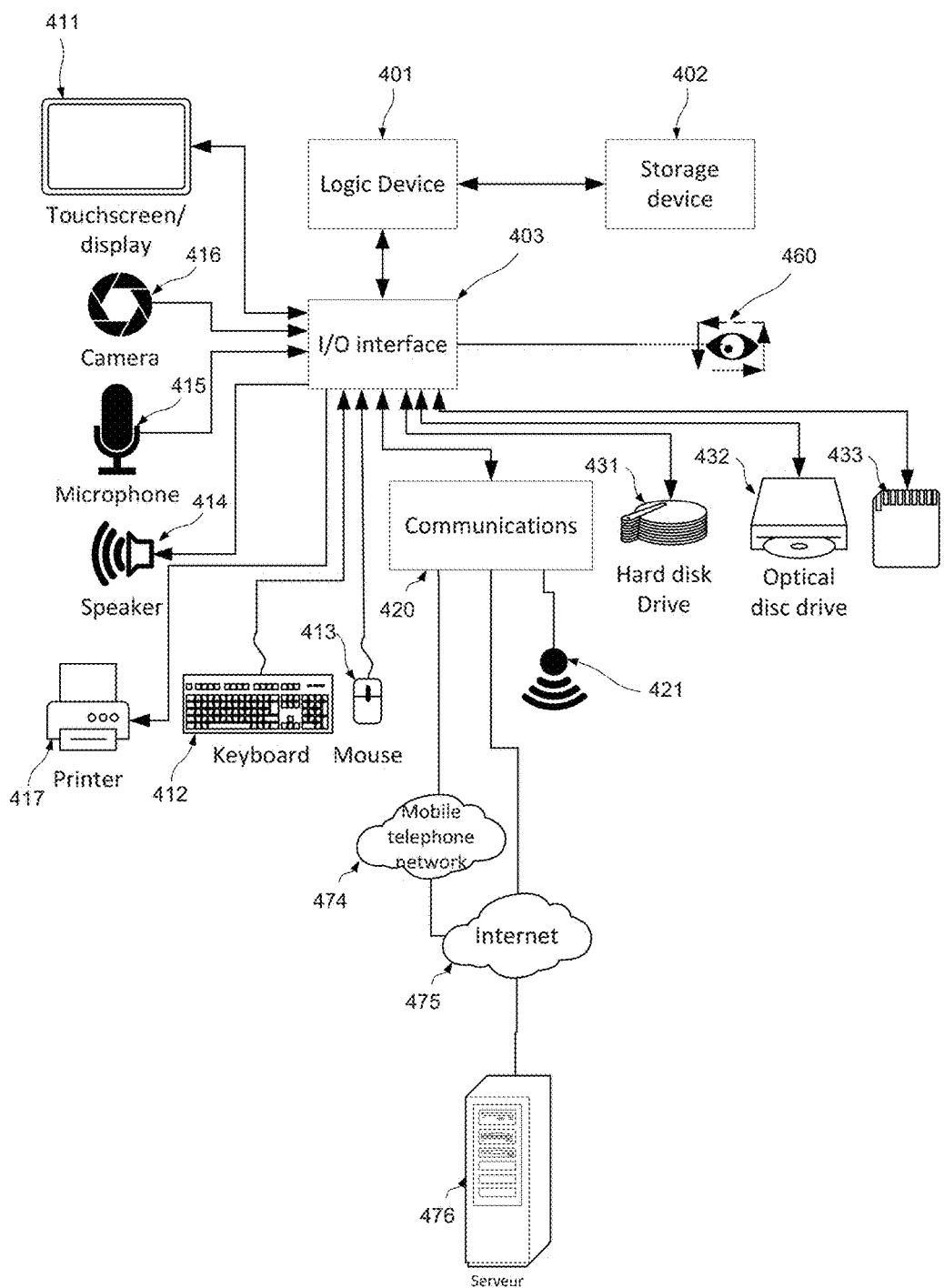
FIG. 4 shows a generic computing system suitable for implementation of embodiments of the invention.

FIG. 4 shows a generic computing system suitable for implementation of embodiments of the invention.

A shown in FIG. 4, a system includes a logic device 401 and a storage device 402. The system may optionally include a display subsystem 411, input subsystem 412, 413, 414, communication subsystem 420, and/or other components not shown.

Logic device 401 includes one or more physical devices configured to execute instructions. For example, the logic device 401 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic device 401 may include one or more processors configured to execute software instructions. Additionally or alternatively, the logic device may include one or more hardware or firmware logic devices configured to execute hardware or firmware instructions. Processors of the logic device may be single-core or multi-core, and the instructions executed thereon may be configured for sequential, parallel, and/or distributed processing. Individual components of the logic device 401 optionally may be distributed among two or more separate devices, which may be remotely located and/or configured for coordinated processing. Aspects of the logic device 401 may be virtualized and executed by remotely accessible, networked computing devices configured in a cloud-computing configuration.

Storage device 402 includes one or more physical devices configured to hold instructions executable by the logic device to implement the methods and processes described herein. When such methods and processes are implemented, the state of storage 402 device may be transformed—e.g., to hold different data.

Storage device 402 may include removable and/or built-in devices. Storage device 402 may comprise one or more types of storage device including optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage device may include volatile, non-volatile, dynamic, static, read/write, read-only, random-access, sequential-access, location-addressable, file-addressable, and/or content-addressable devices.

In certain arrangements, the system may comprise an interface 403 adapted to support communications between the Logic device 401 and further system components. For example, additional system components may comprise removable and/or built-in extended storage devices. Extended storage devices may comprise one or more types of storage device including optical memory 432 (e.g., CD, DVD, HD-DVD, Blu-Ray Disc, etc.), semiconductor memory 433 (e.g., RAM, EPROM, EEPROM, FLASH etc.), and/or magnetic memory 431 (e.g., hard-disk drive, floppy-disk drive, tape drive, MRAM, etc.), among others. Such extended storage device may include volatile, non-volatile, dynamic, static, read/write, read-only, random-access, sequential-access, location-addressable, file-addressable, and/or content-addressable devices.

It will be appreciated that storage device includes one or more physical devices, and excludes propagating signals per se. However, aspects of the instructions described herein alternatively may be propagated by a communication medium (e.g., an electromagnetic signal, an optical signal, etc.), as opposed to being stored on a storage device.

Aspects of logic device 401 and storage device 402 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system implemented to perform a particular function. In some cases, a program may be instantiated via logic device executing machine-readable instructions held by storage device. It will be understood that different modules may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

In particular, the system of FIG. 4 may be used to implement embodiments of the invention.

For example a program implementing the steps described with respect to FIG. 1 may be stored in storage device 402 and executed by logic device 401. Data used for the creation of the graphical representation of the selected space, including data describing the larger space may be stored in storage 402 or the extended storage devices 432, 433 or 431. The Logic device may use data received from the camera 416 or eye tracking system 460 to determine the instantaneous point of regard, and the display 411 used to display the graphical representation.

Accordingly the invention may be embodied in the form of a computer program.

Furthermore, when suitably configured and connected, the elements of FIG. 4 may constitute an apparatus adapted to generate a graphical representation of a selected space, wherein said selected space lies within a larger space and wherein the size of said selected space is defined with regard to a predetermined scale. This apparatus may further be adapted to cause a display unit to display said representation. The apparatus may further be adapted to determine a point of attention of a user within said representation with reference signals received from an eye tracking system. The apparatus may further be adapted to redefine the selected space to correspond to a new selected space positioned with respect to and containing said point of attention responsive to receiving an input via a user interface, said new selected space being situated in the larger space, and the new selected space being defined at a new scale, and the apparatus may further be adapted to regenerate said graphical representation on the basis of said redefined selected space, and to cause said display unit to display said regenerated representation.

It will be appreciated that a "service", as used herein, is an application program executable across multiple user sessions. A service may be available to one or more system components, programs, and/or other services. In some implementations, a service may run on one or more server-computing devices.

When included, display subsystem 411 may be used to present a visual representation of data held by storage device. This visual representation may take the form of a graphical user interface (GUI). As the herein described methods and processes change the data held by the storage device 402, and thus transform the state of the storage device 402, the state of display subsystem 411 may likewise be transformed to visually represent changes in the underlying data. Display subsystem 411 may include one or more display devices utilizing virtually any type of technology. Such display devices may be combined with logic device and/or storage device in a shared enclosure, or such display devices may be peripheral display devices.

When included, input subsystem may comprise or interface with one or more user-input devices such as a keyboard 412, mouse 411, touch screen 411, or game controller, button, footswitch, etc. (not shown). In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, colour, stereoscopic, and/or depth camera for machine vision and/or gesture recognition; a head tracker, eye tracker 460, accelerometer, and/or gyroscope for motion detection and/or intent recognition; as well as electric-field sensing componentry for assessing brain activity.

When included, communication subsystem 420 may be configured to communicatively couple computing system with one or more other computing devices. For example, communication module of may communicatively couple computing device to remote service hosted for example on a remote server 476 via a network of any size including for example a personal area network, local area network, wide area network, or the internet. Communication subsystem may include wired and/or wireless communication devices compatible with one or more different communication protocols. As non-limiting examples, the communication subsystem may be configured for communication via a wireless telephone network 474, or a wired or wireless local- or wide-area network. In some embodiments, the communication subsystem may allow computing system to send and/or receive messages to and/or from other devices via a network such as the Internet 475. The communications subsystem may additionally support short range inductive communications 421 with passive devices (NFC, RFID etc).

Figure 5:
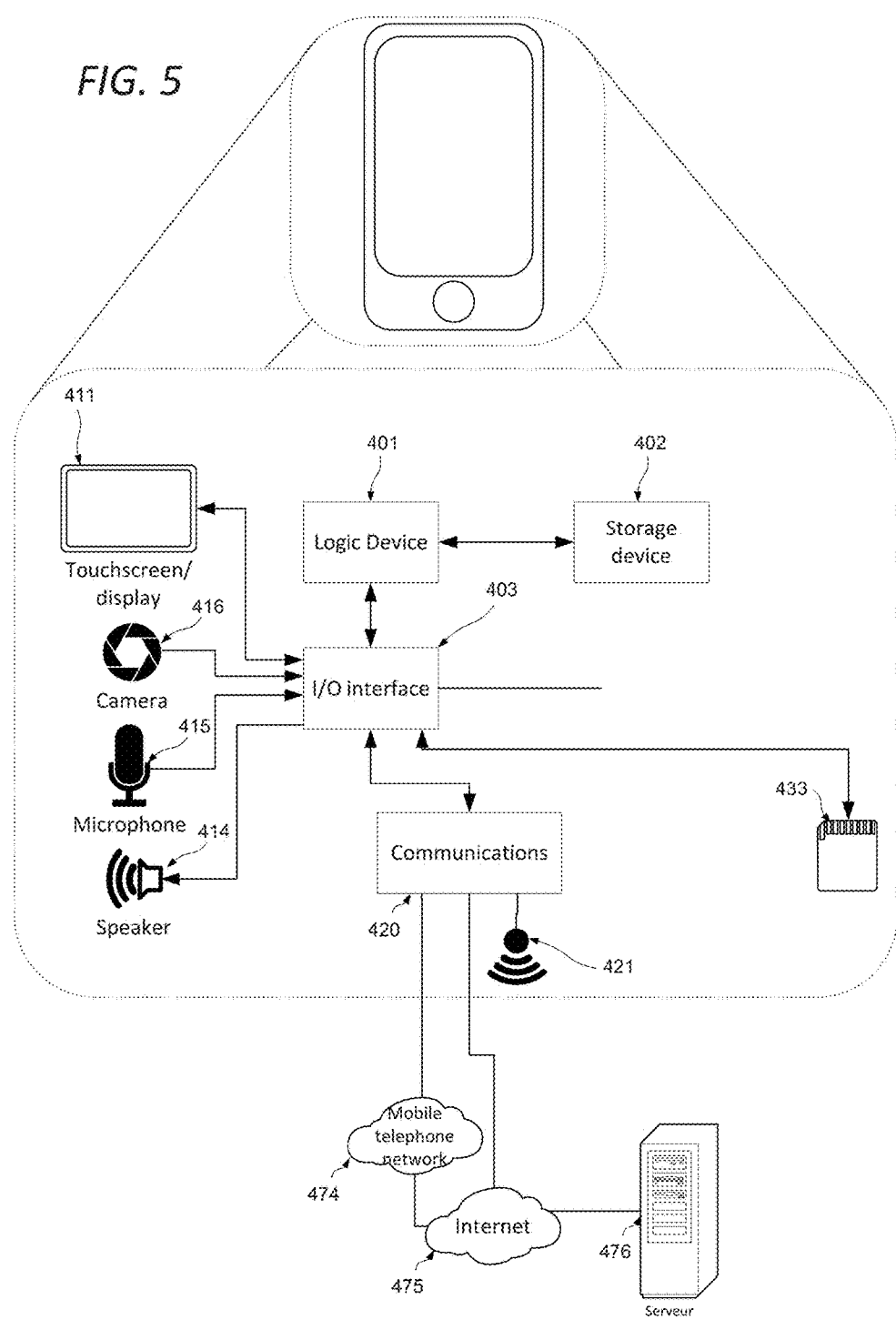
FIG. 5 shows a smartphone device adaptable to constitute an embodiment.
Figure 6:
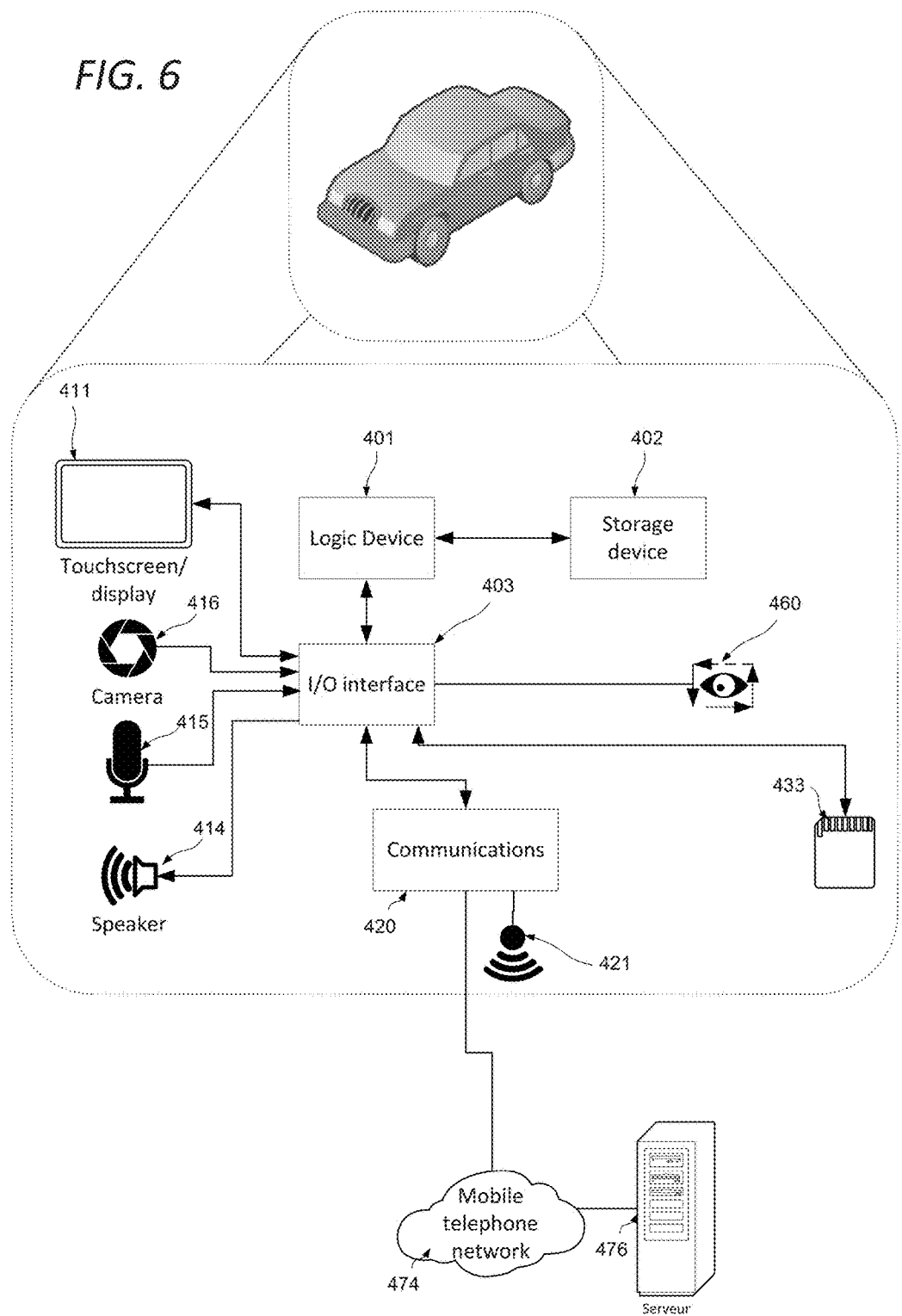
FIG. 6 shows a vehicle adaptable to constitute an embodiment.
Figure 7:
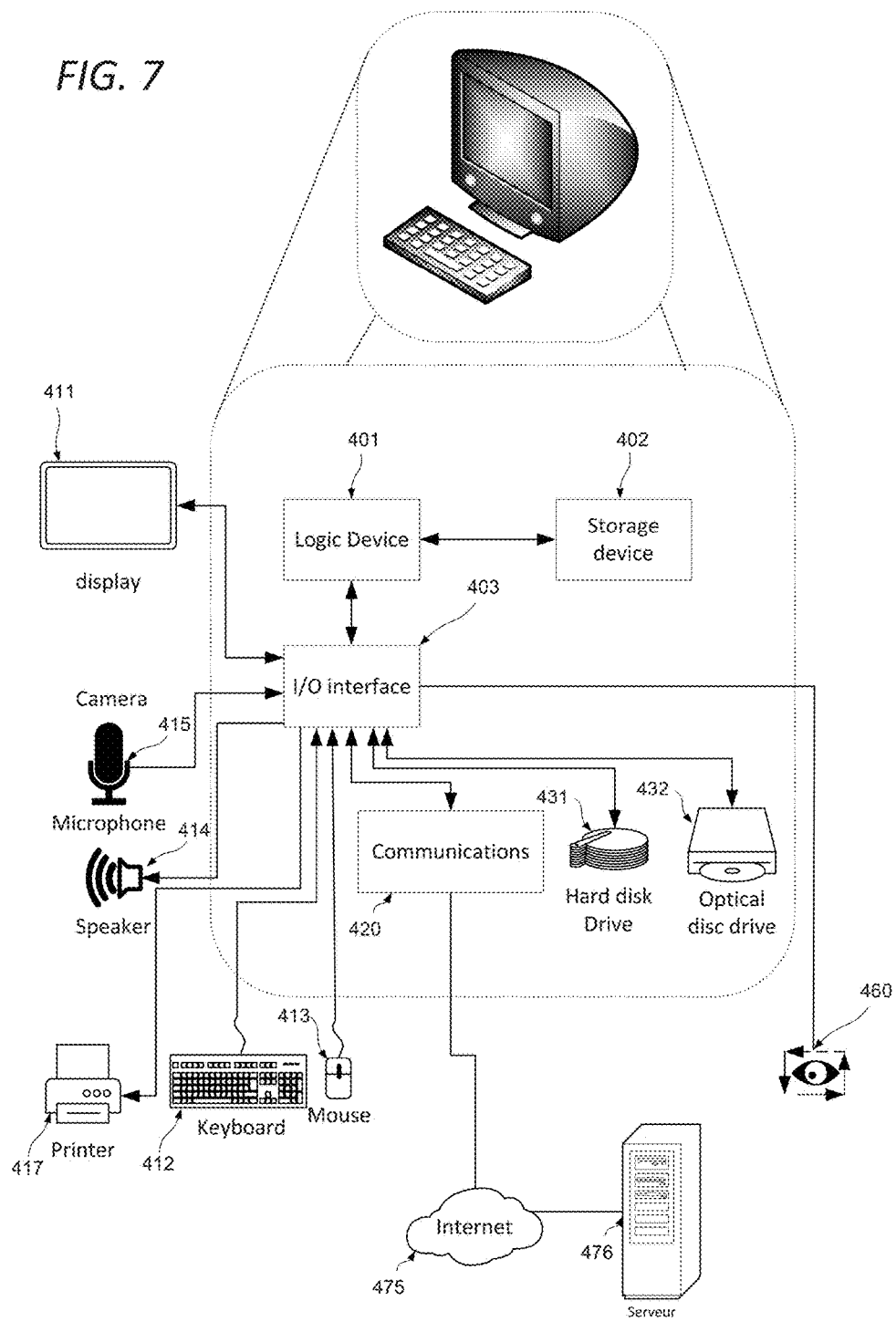
FIG. 7 shows a computer device adaptable to constitute an embodiment.

The system of FIG. 4 is intended to reflect a broad range of different types of information handling system. It will be appreciated that many of the subsystems and features described with respect to FIG. 4 are not required for implementation of the invention, but are included to reflect possible systems in accordance with the present invention. It will be appreciated that system architectures vary widely, and the relationship between the different sub-systems of FIG. 4 is merely schematic, and is likely to vary in terms of layout and the distribution of roles in systems. It will be appreciated that, in practice, systems are likely to incorporate different subsets of the various features and subsystems described with respect to FIG. 4. FIGS. 5, 6 and 7 disclose further example devices in accordance with the present invention. Those of ordinary skill in the art will appreciate that systems may be employed in the future which also operate in accordance with the present invention.

FIG. 5 shows a smartphone device adaptable to constitute an embodiment. As shown in FIG. 5, the smartphone device incorporates elements 401, 402, 403, 420, 433, 414, 415, 416, 411 as described above. It is in communication with the telephone network 474 and a server 476 via the network 475. On the other hand, elements 431, 432, 417, 412, 413 are omitted. The features disclosed in this figure may also be included within a tablet device as well. In this embodiment, the dedicated eye tracking hardware 460 is omitted, and the device depends on the camera 416 with suitable software, for determining the point of regard.

FIG. 6 shows a vehicle adaptable to constitute an embodiment. As shown in FIG. 6, the vehicle comprises elements 401, 402, 403, 420, 421, 433, 414, 415, 416, 460 and 421 as described above. It may be in communication with a server 476 via the mobile telephone network 474. On the other hand, elements 431, 432, 416, 417, 412, 413 and 475 are omitted.

FIG. 7 shows a computer device adaptable to constitute an embodiment. As shown in FIG. 7, the computer device incorporates elements 401, 402, 403, 420, 430, 431, 432, as described above. It is in communication with elements 414, 415, 417, 412, 460 and 413 as peripheral devices which may also be incorporated in the same computer device, and with a server 476 via the network 475. On the other hand, elements 433, 421 and 474 are omitted, and element 411 is an ordinary display with or without touchscreen functionality.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method of managing a graphical representation of a physical space within a larger space, said method comprising:
   generating a graphical representation of a selected space, wherein said selected space lies within said larger space and wherein the size of said selected space is defined with regard to a predetermined scale;
   displaying said graphical representation;
   determining respective gaze points of a plurality of users within said graphical representation;
   determining a combined point of attention of said users within said graphical representation, said combined point of attention being positioned away from said determined gaze points and preferentially with respect to certain types of feature within said graphical representation;
   responsive to an input via a user interface, redefining said selected physical space to correspond to a new selected space positioned with respect to and containing said combined point of attention, said new selected space being situated in said larger space, and said new selected space being defined at a new scale, and
   regenerating said graphical representation accordingly to said new selected space.

2. The method of claim 1 wherein at said generating, said graphical representation is generated so as to incorporate a graphical user interface cursor.

3. The method of claim 1 wherein said generating, displaying and determining are repeated iteratively.

4. The method of claim 3 wherein at said regenerating, said graphical representation is regenerated so as to incorporate an indication of said combined point of attention.

5. The method of claim 1 wherein said determining the combined point of attention of said users within said graphical representation comprises determining a weighted average of each said user's gaze point over a predetermined duration.

6. The method of claim 1 in which the centre of said new selected space is situated at said combined point of attention.

7. The method of claim 1 in which said selected space, said larger space and said graphical representation are two dimensional.

8. The method of claim 1 in which said selected space, said larger space and said graphical representation are three dimensional.

9. The method of claim 1 wherein at said redefining said selected space, the centre of said selected space is unchanged with respect to said larger space.

10. A computer program product stored in a non-transitory computer storage medium for managing a graphical representation of a physical space within a larger space, comprising instructions for:
   generating a graphical representation of a selected space, wherein said selected space lies within said larger space and wherein the size of said selected space is defined with regard to a predetermined scale;
   displaying said graphical representation;
   determining respective gaze points of a plurality of users within said graphical representation;
   determining a combined point of attention of said users within said graphical representation, said combined point of attention being positioned away from said determined gaze points and preferentially with respect to certain types of feature within said graphical representation;
   responsive to an input via a user interface, redefining said selected physical space to correspond to a new selected space positioned with respect to and containing said combined point of attention, said new selected space being situated in said larger space, and said new selected space being defined at a new scale, and
   regenerating said graphical representation accordingly to said new selected space.

11. An apparatus adapted to generate a graphical representation of a selected space, wherein said selected space lies within a larger space and wherein the size of said selected space is defined with regard to a predetermined scale;

said apparatus further being adapted to cause a display unit to display said graphical representation;

said apparatus further being adapted to determine respective gaze points of a plurality of users within said graphical representation with reference to signals received from an eye tracking system;

said apparatus further being adapted to determine a combined point of attention of said users within said graphical representation, said point of attention being positioned away from said determined gaze points and preferentially with respect to certain types of feature within said graphical representation;

said apparatus further being adapted to redefine said selected space to correspond to a new selected space positioned with respect to and containing said combined point of attention responsive to receiving an input via a user interface, said new selected space being situated in said larger space, and said new selected space being defined at a new scale; and said apparatus further being adapted to regenerate said graphical representation on the basis of said new selected space, and to cause said display unit to display said regenerated graphical representation.

* * * * *